United States Patent
Shen et al.

(10) Patent No.: US 12,242,116 B2
(45) Date of Patent: Mar. 4, 2025

(54) OPTICAL FIBER CONNECTOR DEVICE AND METHOD

(71) Applicant: Twinstar Technologies Co. Ltd., Shanghai (CN)

(72) Inventors: Jinxi Shen, San Ramon, CA (US); Wei Hou, Shanghai (CN); Lianjun Zhang, Shanghai (CN); Bin Xu, Shanghai (CN)

(73) Assignee: Twinstar Technologies Co. Ltd., Shanghai (CN)

( * ) Notice: Subject to any disclaimer, the term of this patent is extended or adjusted under 35 U.S.C. 154(b) by 0 days.

(21) Appl. No.: 18/738,119

(22) Filed: Jun. 10, 2024

(65) Prior Publication Data
US 2025/0020869 A1    Jan. 16, 2025

(30) Foreign Application Priority Data

Jul. 10, 2023  (CN) .......................... 202321796811.8
Aug. 17, 2023 (CN) .......................... 202322219242.7

(51) Int. Cl.
*G02B 6/38* (2006.01)
(52) U.S. Cl.
CPC ......... *G02B 6/3885* (2013.01); *G02B 6/3839* (2013.01); *G02B 6/3858* (2013.01); *G02B 6/3897* (2013.01)
(58) Field of Classification Search
CPC .. G02B 6/3885; G02B 6/3839; G02B 6/3858; G02B 6/3897; G02B 6/38
See application file for complete search history.

(56) References Cited

U.S. PATENT DOCUMENTS

| | | | | |
|---|---|---|---|---|
| 6,132,107 A | * | 10/2000 | Morikawa ............ | G02B 6/4214 257/432 |
| 2009/0097802 A1 | * | 4/2009 | Tamura ................. | G02B 6/421 385/85 |
| 2016/0246004 A1 | * | 8/2016 | Kachru ................... | G02B 6/32 |
| 2023/0251428 A1 | | 8/2023 | Schaevitz et al. | |

* cited by examiner

*Primary Examiner* — Jennifer Doan
(74) *Attorney, Agent, or Firm* — Mestechkin Law Group P.C.

(57) ABSTRACT

An optical connector includes a fiber positioning assembly and a frame having two walls for supporting the fiber positioning assembly in a controlled vertical alignment relative to the frame. The fiber positioning assembly includes an optical fiber array disposed at a top surface of a support block for positioning between the walls, and a cap covering top portions of the optical fibers projecting from the block. The cap has a flat alignment surface resting upon the fiber top portions and extending laterally beyond the support block such that when the block is disposed between the walls, free portions of the alignment surface rest upon the walls to control the vertical alignment of the array. A single rail affixed to a bottom shelf of the frame, and a correspondingly dimensioned rectangular notch at the bottom of the support block, control the horizontal alignment of the array.

20 Claims, 10 Drawing Sheets

Attach a longitudinally oriented rail at a bottom of the frame between the walls — 610

Attach a pair of plates alongside each other at a bottom of the fiber support member, with polished sides of the plates facing each other and spaced to accept the rail — 620

OPTICAL FIBER CONNECTOR DEVICE AND METHOD

REFERENCE TO RELATED APPLICATION

This application claims the benefit of Chinese Patent Application No. 2023217968118 filed Jul. 10, 2023 and Chinese Patent Application No. 2023222192427 filed Aug. 17, 2023, the entire contents of which is incorporated herein by reference.

TECHNICAL FIELD

The present disclosure generally relates to optical communication systems and components thereof, and more particularly relates to optical connectors.

BACKGROUND

Optical interconnects capable of high-density data traffic may be useful in data communication and processing systems, such as large data centers and computer systems supporting artificial intelligence (AI) computations. To reduce power consumption and simplify manufacturing and installation of data service equipment, such interconnects should preferably be passive, pluggable, and capable of interconnecting two high-density optical fiber arrays, or connecting a high-density optical fiber array to a silicon photonic chip.

SUMMARY

An aspect of the present disclosure provides an optical connector. The optical connector comprises a frame and a positioning assembly. The frame comprises a shelf and two walls projecting therefrom, the walls being spaced apart to define a longitudinally extending trench therebetween. The positioning assembly is for positioning an array of optical fibers within the trench to optically couple with an optical device disposed in the trench. The positioning assembly comprises a fiber support member and a cap affixed thereto. The fiber support member comprises a planar top surface having a plurality of longitudinal grooves formed therein, and the array of optical fibers disposed in the grooves, top portions of the optical fibers of the array projecting above the top surface of the fiber support member. The cap is fixedly disposed over the fiber support member and has an alignment surface resting upon the top portions of the optical fibers of the array. The cap is wider than the fiber support member, such that, when the positioning assembly is disposed within the trench in an operating position, free portions of the alignment surface of the cap rest upon the walls to control a vertical alignment of the fiber support member within the trench.

An aspect of the present disclosure provides a method for fabricating the optical connector. The method comprises polishing the alignment surface of the cap and top surfaces of the walls of the frame to sub-micron flatness, and attaching the cap to the fiber support member such that the alignment surface rests upon the top portions of the optical fibers of the array, and such that the alignment surface has free portions extending laterally beyond the fiber support member at both sides thereof.

BRIEF DESCRIPTION OF THE DRAWINGS

Example embodiments disclosed herein will be described in greater detail with reference to the accompanying drawings, which are not to scale, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present disclosure. However, it will be apparent to one skilled in the art that the present disclosure may be practiced in other embodiments that depart from these specific details. In other instances, detailed descriptions of well-known methods, devices, and circuits may be omitted so as not to obscure the description of the present disclosure. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise.

Figure 1:
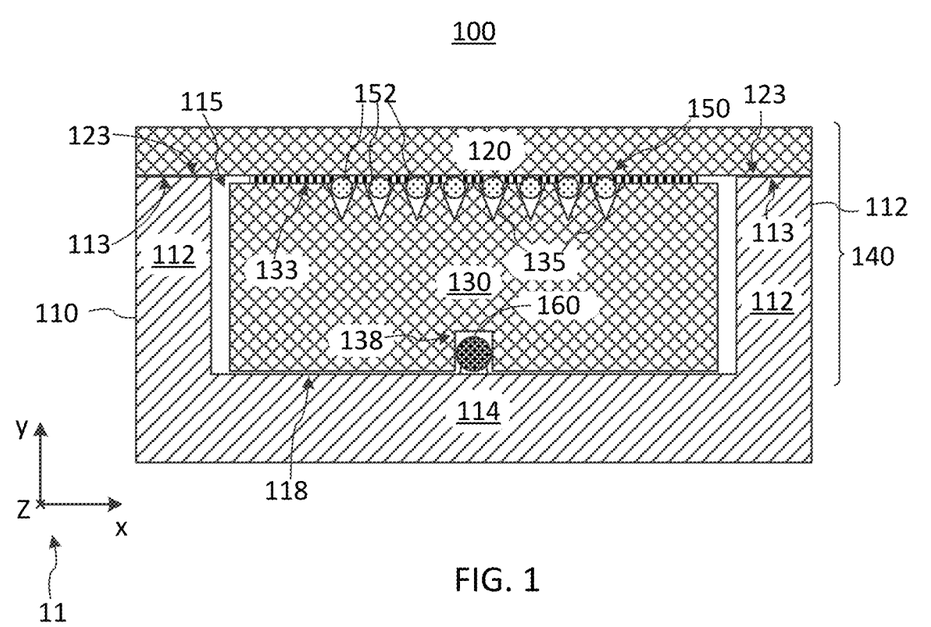
FIG. 1 is a schematic cross-sectional view of an example optical connector including a fiber positioning assembly disposed in a frame.

FIG. 1 shows a schematic cross-sectional view of an optical connector device 100 ("optical connector 100") according to an example embodiment. In the following, the optical connector 100 and elements or embodiments thereof may be described with reference to a Cartesian coordinate system (x,y,z) 11 having a z-axis in the direction of light propagation in the optical connector, also referred to herein as the longitudinal direction. FIG. 1 illustrates a cross-section of the optical connector 100 in the (x,y) plane of the coordinate system 11. The optical connector 100 includes a positioning assembly 140 ("assembly 140") and a frame 110. The frame 100 has a shelf 114 and two walls 112 projecting therefrom to form a trench 115. The assembly 140 is configured to be disposed between the walls 112 within the trench 115. The walls 112 are to support the positioning assembly 140 in a precisely controlled vertical position within the frame, and may also be referred to as the support walls. The trench 115 is bound at the sides by the support walls 112 and extends in the longitudinal direction perpendicular to the plane of FIG. 1. The assembly 140 has portions configured to be resting upon the walls 112. The height of the walls 112 controls the vertical positioning of the assembly 140 relative to the frame 110, as further described below.

The positioning assembly 140 may include a fiber support member 130, e.g. a glass block or the like, and a cap 120 attached thereto. Other suitable material for the fiber support member 130 include, but are not limited to, polycarbonate, silicon, or silica. The fiber support member 130, which may also be referred to as the fiber support block 130, has one or more grooves 135 formed in a top surface 133 thereof, e.g. v-grooves, with one or more optical fibers 152 resting in respective ones of the grooves 135. The height of the fiber support member 130 may be somewhat smaller than the height of the walls 112, i.e. may be smaller than the depth of the trench 115. The top surface 133 of the fiber support member 130 between and about the grooves 135 may be flat, so that the grooves 135 are approximately aligned to a same plane. In the illustrated example, the fiber support member 130 includes a plurality of v-grooves 135 extending along each other in the longitudinal direction to support an array 150 of the optical fibers 152. Top portions of the optical fibers 152 project above the top surface 133 of the support member 130.

The cap 120 is fixedly attached to the support member 130, e.g. to the top surface 133 thereof, to cover the optical fibers 152. The cap 120 has a surface 123 resting upon the top portions of the optical fibers 152, preferably in direct contact therewith. The surface 123 of the cap 120 is flat to a good precision, so that the top portions of the optical fibers 152 are horizontally aligned, conforming to the cap surface 123. The surface 123 of the cap 120 may be referred to herein as the alignment surface 123. The cap 120 is wider than the fiber support 130, such that the cap 120 and the alignment surface 123 have free portions that extend horizontally beyond the support member 130 at both sides thereof, so as to rest upon the walls 112 of the frame 110 when the fiber support member 130 is in an operating position within the frame 110. Here and in the following examples, the horizontal, or lateral, direction is the direction along the alignment surface 123 perpendicular to the v-grooves 135 (the x-axis of the coordinate system 11), with the direction perpendicular to the alignment surface 123 (the y-axis) referred to as the vertical direction or the transverse direction. The cap 120 may be, for example, a plate of a suitable material, such as e.g. glass, or other suitable material including but not limited to polycarbonate, silicon, or silica, and may be sufficiently thick to prevent or at least minimize deformations due to handling or environmental influences. By way of example, the cap 120 may be a glass plate that is 0.2 mm to 2 mm thick.

The walls 112 may have flat top surfaces 113 that are configured to be in a same horizontal plane, i.e. the (x,z) plane of the coordinate system 11, such that the top wall surfaces 113 ("support surfaces 113") come to be in a direct surface-to-surface contact with the free portions of the alignment surface 123 when the assembly 140 is in the operating position, with the fiber support member 130 positioned within the trench 115 between the walls 112. The surfaces 113 and 123 may be polished to a high degree of flatness to accurately control the vertical positioning of the assembly 140, and therefore the optical fibers 152, within the trench 115. In an example embodiment the surfaces 123, 133, or at least portions thereof that may be in a direct contact when the assembly 140 is supported by the frame 110 in the operating position, may each be polished to a sub-micron flatness tolerance. E.g., the surfaces 123, 133 may each be flat to a flatness tolerance of 0.5 micrometer (μm), or preferably 0.2 μm. Here, the terms "flatness" and "flatness tolerance" of a surface are used interchangeably to refer to a minimum distance between two parallel planes between which the surface must fit. In some embodiments wherein a target operating wavelength λ of the optical connector 100 is specified, the surfaces 113 and 123 may have a flatness specification along the area of their interface 123/113 of, e.g., λ/2, or λ/3, or preferably λ/4. By way of example, λ=0.6 μm, and the surfaces 123, 133 may each be polished to a flatness of 0.3 μm, or 0.2 μm, or 0.15 μm.

In some embodiments, the fiber support member 130 may have a lateral alignment feature 138, which may be matched to a corresponding lateral alignment feature 160 of the frame 110. The lateral alignment feature 138 may be in a predetermined lateral position relative to the v-grooves 135, e.g. laterally centered thereto, with a sub-micron positioning accuracy tolerance. The lateral alignment features 138, 160 are for controlling the lateral positioning of the fiber support block 130 between the walls 112. In the illustrated example, the lateral alignment feature 138 is a longitudinally extending notch at the bottom of the fiber support block 130. The lateral alignment feature 160 of the frame 110 is a longitudinally disposed rail attached to the surface 118 of the shelf 114 between the walls 112 and dimensioned to fit within the notch 138. In an example embodiment, the notch 138 has a rectangular cross-section, and the rail 160 is a cylindrical rod dimensioned to fit within the notch 138 with a small margin to allow movement therealong. By way of example, the notch 138 may be 0.5 μm to 5 μm wider than the rail 160. Here, the terms "width", "wider", and the like refer to the lateral dimension of the corresponding element, i.e. the dimension in the horizontal direction, along the x-axis in FIG. 1, while the term "height" and the like refer to the vertical dimension of the corresponding element, i.e. the dimension along the y-axis in FIG. 1. The internal side walls of the notch 138 may be flat with a sun-micron flatness tolerance, e.g. to a flatness of 0.5 μm or better, and along the areas of possible contact between them. The outer surface of the rail 160 may also be length-wise flat along the lengths of a possible contact with the walls of the notch 138, e.g. to a same flatness tolerance, as described below.

In some embodiments, the positioning assembly 140 may be pluggable into the frame 110. E.g. the positioning assembly 140 may be configured to be removably inserted into the trench 115 between the walls 112. In some embodiments, the positioning assembly 140 may be slidable along the trench 115 to a target position within the trench 115. In some embodiments, the positioning assembly 140 may be fixedly disposed, e.g. glued, within the trench 115.

Figure 2:
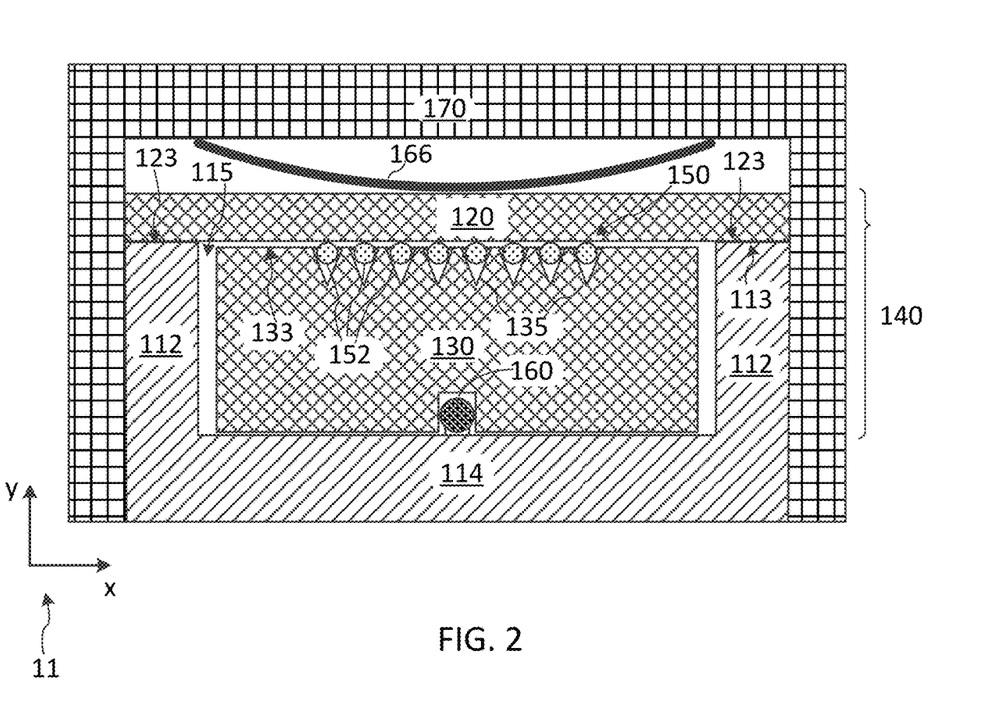
FIG. 2 is a schematic cross-sectional view of an example optical connector including a clamp shell.

FIG. 2 illustrates an optical fiber connector 200, which may be an embodiment of the optical connector 100. Same elements in FIGS. 1 and 2 are indicated with same reference numerals and may not be described here again. The optical fiber connector 200 has an added clamp shell 170 to hold the cap 120 vertically tight to the walls 112 of the frame 110. In this example, the added clamp shell 170 is configured to hold the assembly 140 within the trench 115 of the frame 110. In some implementations, the clamp shell 170 may be removable. A resilient load 166, such as a spring, may be provided within the shell 170 to push upon the cap 120 to fixedly hold the assembly 140 within the trench 115, ensuring a direct contact between the free portions of the alignment surface 123 of the cap 120 and the top support surfaces 113 of the support walls 112. In some embodiments other resilient loads may be used for this purpose, such as e.g. a piece of resilient material such as rubber or rubber-like material; such materials may be attached within the shell 170, e.g. glued to the top inner surface thereof.

Figure 3:
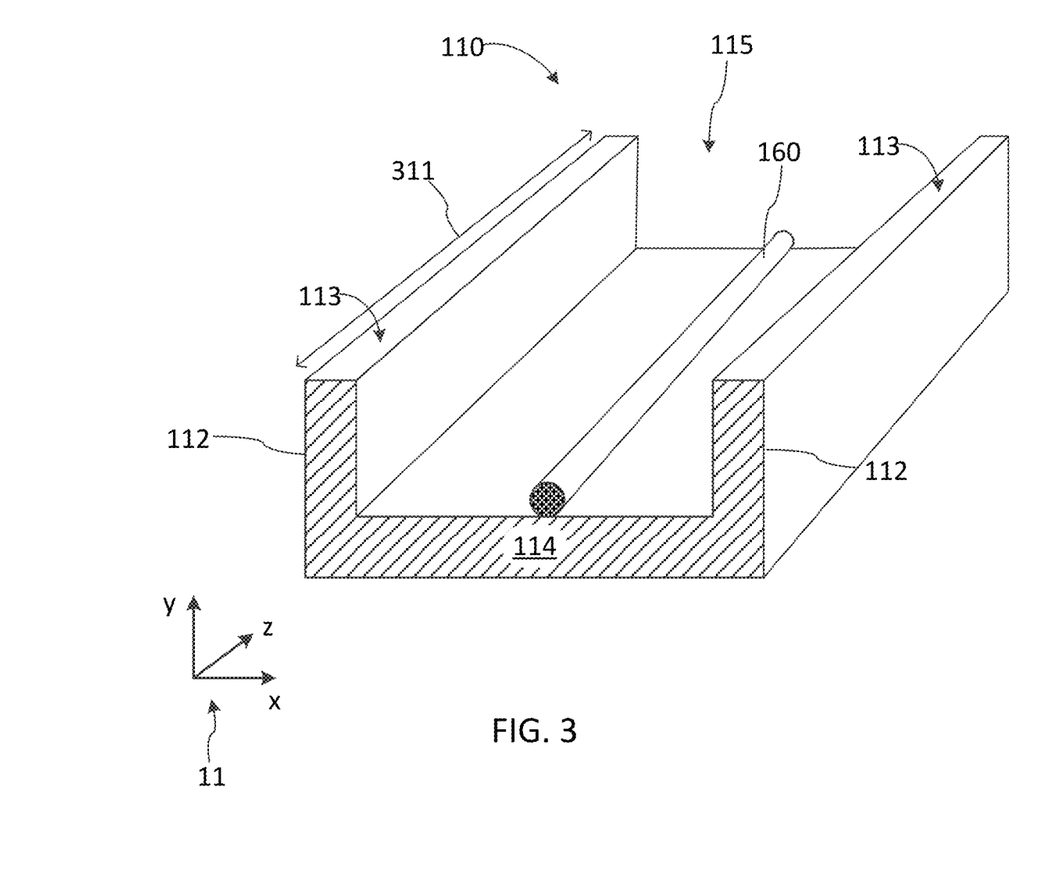
FIG. 3 is a schematic perspective view of the frame of the optical connector of FIG. 1 or FIG. 2.
Figure 4:
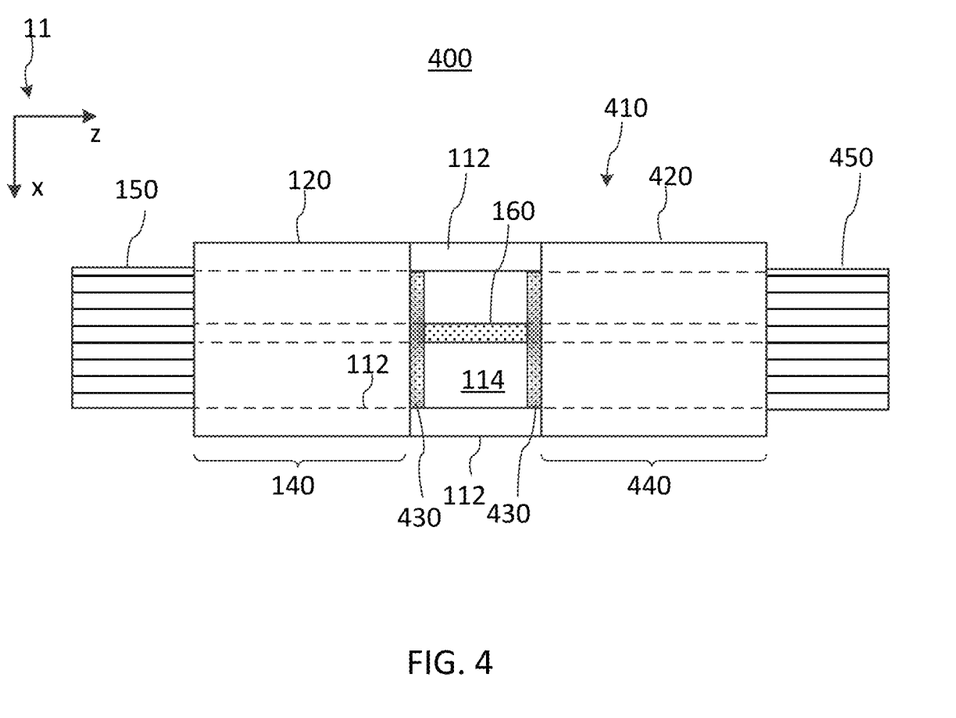
FIG. 4 is a schematic plan view of an embodiment of an optical connector assembly including the fiber positioning assembly of FIG. 1 optically coupled to another optical device located in a same frame.

Referring to FIGS. 3 and 4, the frame 110 may extend in the longitudinal direction (the z-axis) to a length 311 sufficient to accommodate two instances of the positioning assembly 140, length-wise one after the other, with their respective caps 120 resting upon the walls 112 at corresponding locations along the trench 115. Advantageously, the alignment of the optical fiber arrays of the two assemblies to the top surfaces 113 of the same support walls 112 may ensure good vertical alignment of the optical fiber arrays to each other, up to the flatness specification of the respective contacting surfaces. The lateral alignment of the optical fibers of the two fiber positioning assemblies to the same rail 160 may facilitate good lateral alignment of corresponding optical fibers of the two arrays to each other, as defined in part by the accuracy of the lateral positioning of the alignment notches at the bottoms of the respective fiber positioning assemblies relative to the corresponding fiber arrays.

FIG. 4 illustrates a top view of an example optical connector assembly 400. The optical connector assembly 400 optically couples an optical fiber array 150 to an optical device 410 supporting an optical waveguide array 450. The optical connector assembly 400 includes a frame, such as e.g. frame 110 described above, with support walls 112 and a rail 160 extending therealong. A fiber positioning assembly 140 supports end portions of the fiber array 150 in corresponding v-grooves, as described above. The fiber positioning assembly 140 and the optical device 410 are aligned upon the rail 160 disposed between the walls 112, both resting upon the walls 112 as described above with reference to FIGS. 1-3 and the fiber positioning assembly 140. The lateral alignment of the fiber positioning assembly 140 and the optical device 410, i.e. their relative positioning along the x-axis, is controlled by the rail 160. The fiber positioning assembly 140 may be configured to be pluggable into the frame of the optical connector 400. In some implementations, optical lens elements 430, e.g. micro-lens arrays, may be provided to facilitate optical coupling of the optical fiber array 150 to the optical fiber or optical waveguide array of the optical device 410.

The optical device 410 may comprise, for example, another fiber positioning assembly 440, similar to the fiber positioning assembly 140, supporting an array of optical fibers 450 aligned to a cap 420 resting upon the walls 112. The fiber positioning assembly 440 may be pluggable, or may be affixed to the frame of the optical connector 400, such e.g. as the frame 110 described above. The vertical alignment of proximate fiber ends of the fiber arrays 150 and 450, i.e. their alignment along the y-axis normal to the plane of FIG. 4, is controlled by the alignment of each of the fiber arrays 150, 450 to the top surfaces of the same walls 112. Alternatively, the optical device 410 may comprise a photonic chip that includes an array of planar optical waveguides at a top surface thereof, with the cap or carrier 420 being attached to a surface of the chip where the optical waveguides are located, free portions of the carrier resting upon the walls 112. In some implementations, the photonic chip may be affixed to the frame 110.

A method of fabricating an optical connector having features of the present disclosure, such as e.g. the connector 100, 200, or 400, is described below with reference to FIGS. 5-8B.

Figure 5:
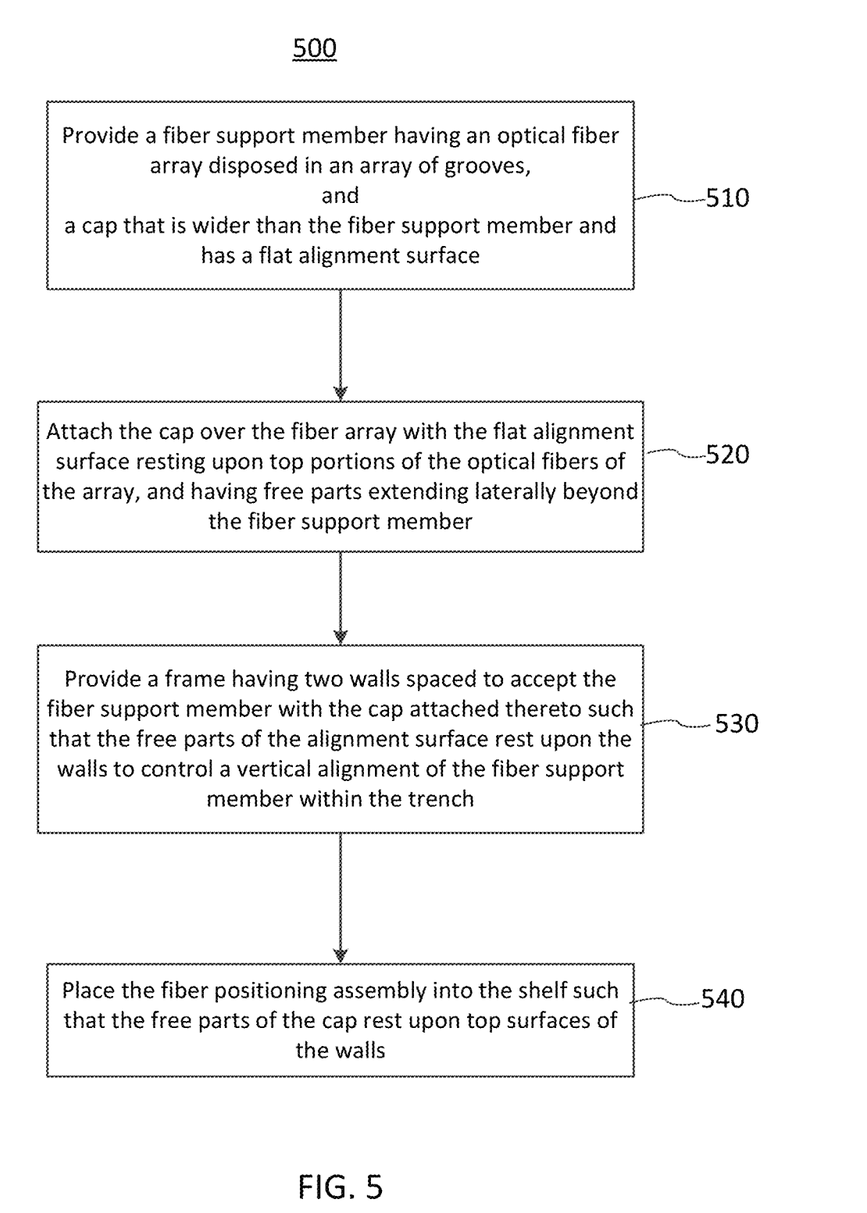
FIG. 5 is a flowchart of a method for fabricating the optical connector of FIG. 1.

FIG. 5 is a flowchart illustrating some steps of an example method 500 for fabricating an optical connector, such as e.g. the optical connector 100, 200, or 400 described above. In various implementations, some of these steps may be omitted, and/or other steps may be added. In the illustrated example, method 500 may start with step 510, in which a fiber support member, such as e.g. the fiber support member 130, and a cap member, such as e.g. the cap 120, are provided. The fiber support member has an optical fiber array, e.g. the fiber array 150, disposed in an array of grooves, e.g. the v-grooves 135, which are formed in a top surface thereof. The optical fibers in the v-grooves are aligned in a direction that is referred to herein as longitudinal (the z-axis in FIGS. 3, 4). The grooves are dimensioned in such a manner that, when the optical fibers of the array are placed within the grooves, top portions of the optical fibers project above the top surface of the fiber support member, as described above with reference to FIG. 1 and below with reference to FIG. 7B. The cap is wider than the fiber support member in a direction lateral to the v-grooves, typically by 0.5 to 2 millimeters or more.

In various implementations, step 510 may in turn include one or more sub-steps, such as, e.g., fabricating the v-grooves in a flat top surface of the fiber support member or a support substrate described below, placing end portions of optical fibers of the array into the v-groves, and polishing one side of the cap to a sub-micron flatness to provide an alignment surface, e.g. the surface 123. By way of example, the flatness tolerance of the alignment surface, e.g. 123, may be about or better than 0.5 µm typically, or about 0.2 µm or less preferably. In some embodiments where the optical connector is fabricated for a target operating wavelength λ, the alignment surface of the cap may be prepared, e.g. polished, to a flatness specification defined as a fraction of the wavelength, e.g. to a flatness of λ/2 or better, or λ/4 preferably.

At step 520 the fiber positioning assembly, such as e.g. the fiber positioning assembly 140 described above, is fabricated. This step includes attaching, e.g. gluing, the cap, e.g. 120, to the top surface, e.g. 133, of the fiber support member, e.g. 130. The cap is positioned over the fiber array, e.g. 150, such that the flat alignment surface of the cap, e.g. 123, rests upon the top portions of the optical fibers of the array, and such that free portions of the cap extend laterally beyond the fiber support member, e.g. as described above with reference to FIG. 1 and below with reference to FIG. 7C. The resulting sub-assembly may have a layer of glue, e.g. 712 in FIG. 7C, in a gap between the cap, e.g. 120, and the top surface of the fiber support member, e.g. 133. Before the glue solidifies, the cap may be forced toward the fibers to ensure that the alignment surface of the cap is in direct contact with each of the fibers along the grooves, so that the fibers are aligned at the top to the flatness specification of the alignment surface. This operation results in the optical cores of the fibers being approximately aligned with each other. The mutual alignment of the optical cores of the fibers of the array may be limited primarily, or at least in part, by core-cladding concentricity variations of the optical fibers. By way of example, the fiber concentricity tolerance is less than 0.5 µm typically, so that the optical fiber cores are aligned along a same plane with sub-micron precision.

Step 530 includes providing, e.g. fabricating, a frame in which the fiber positioning assembly may be placed in a precise, e.g. sub-micron, alignment with another optical device similarly positioned within the frame. The frame, such as e.g. frame 110 described above, has two walls, e.g. 112, spaced to accept the fiber support member with the cap attached thereto, such that the free portions of the alignment surface of the cap rest upon the walls to control a vertical alignment of the fiber support member within the trench, e.g. as described above with reference to FIGS. 1-4. This step may include preparing top surfaces of the walls, e.g. by polishing, to be flat along the length thereof, e.g. 311 in FIG. 3C, on a sub-micron scale. E.g., the top surface of the walls may be prepared to about the same sub-micron flatness as the alignment surface of the cap, e.g. typically to a flatness specification of 0.5 μm or better, or to a flatness of 0.2 μm or better. The length of the trench, e.g. the length 311 in FIG. 3, may be sufficient to accept, e.g., two instances of the fiber positioning assembly disposed length-wise therein one after another, or a fiber positioning assembly and an optical chip affixed to a carrier cap, e.g. as described above with reference to FIG. 4. The flat top surfaces of the frame walls provide a common vertical alignment reference for the two optical devices disposed in the trench and sharing the walls for support.

An optional step 540 includes placing the optical positioning assembly fabricated in step 530 into the trench of the frame, so that the free portions of the cap rest upon, and are preferably in direct contact with, the flat top surfaces of the walls of the frame.

Figure 6:
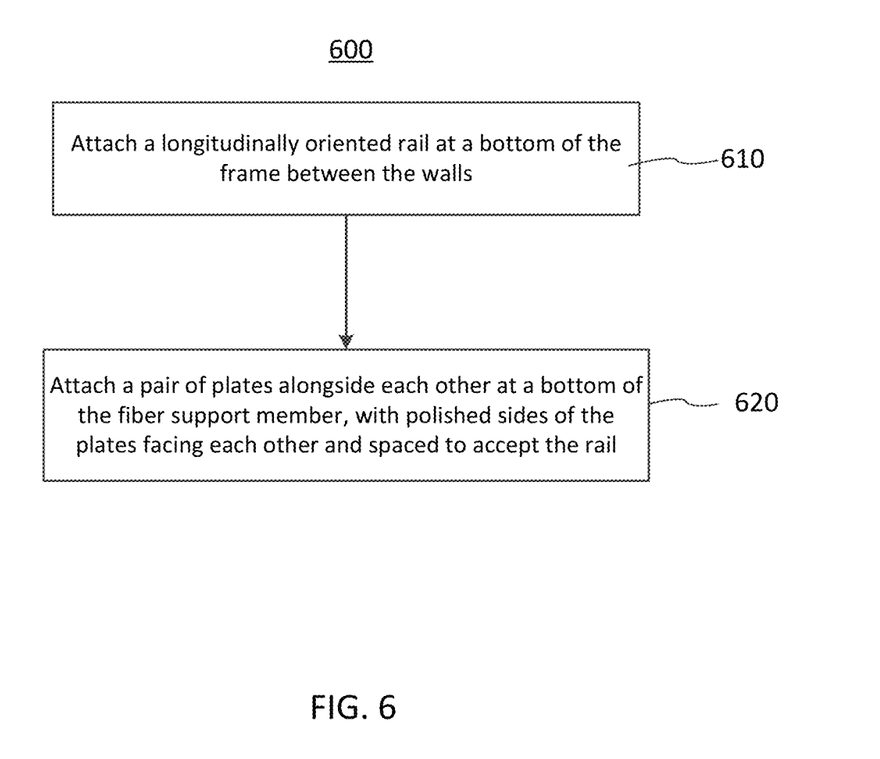
FIG. 6 is a flowchart of a method for fabricating lateral alignment features of the optical connector of FIG. 1.

Turning to FIG. 6, in some implementations a method for fabricating an optical connector, e.g. method 500, may include method 600 of fabricating lateral alignment features for controlling the lateral positioning of a fiber positioning assembly between walls of a frame, such as e.g. features 138 and 160 described above with reference to the frame 110 and the positioning assembly 140. An example implementation of method 600 is illustrated in FIGS. 7C-8B. Method 600 may include (610) attaching a longitudinally oriented rail, e.g. the rail 160, at a bottom shelf of the frame, e.g. 110, between the walls, e.g. 112. In some implementations, the rail 160 may be a straight cylinder having a polished surface, e.g. to a length-wise flatness of about 0.5 μm or better, or preferably about 0.2 μm or better. Here, "length-wise flatness" refers to the range in which a minimum distance from the rail to a plane parallel thereto varies along the rail.

Method 600 may further include (620) attaching a pair of plates (e.g. 720A and 720B described below with reference to FIGS. 7D and 7E) alongside each other at a bottom of the fiber support member or substrate. The plates may be attached with flat side faces of the plates facing each other and spaced to form a longitudinally extending rectangular notch at the bottom of the assembly, to accept the rail when the fiber positioning assembly is placed between the walls of the frame. The method may include preparing the side faces of the plates facing each other in the assembly to have sub-micron flatness along the length of the fiber positioning assembly, e.g. by polishing the side faces of the plates prior to the attaching the plates to the substrate. By way of example, the side faces of the plates may be polished to a flatness of about 0.5 μm or better, or preferably about 0.2 μm or better. In an example implementation, the rail and the plates may be prepared so that the surface-to-surface flatness at the interface of the rail and any one of the sides of the plates forming the notch may be 0.5 μm or better, or preferably about 0.2 μm or better.

Figure 7A:
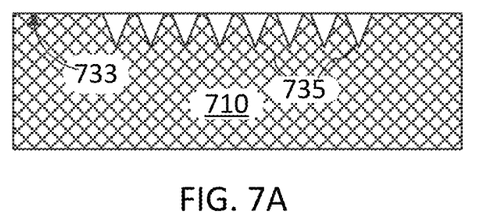
FIGS. 7A-7F are schematic cross-sectional views of different elements of an embodiment of the fiber positioning assembly of FIG. 1 at different fabrication stages thereof according to an example implementation.
Figure 7B:
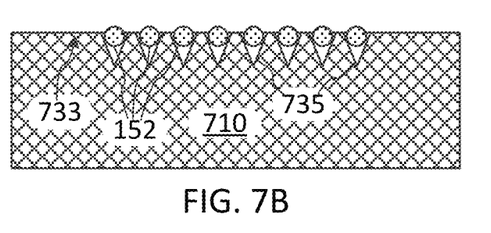

Referring first to FIGS. 7A and 7B, in one embodiment the process of method 500 may start with fabricating, or otherwise obtaining, a fiber support substrate 710 having a plurality of v-groves 735 formed in a top surface 733 thereof. The v-grooves 735 and the top surface 733 are examples of the top surface 133 and the v-grooves 135, respectively, of the fiber support member 130 shown in FIGS. 1 and 2. The substrate 710 may be, e.g. a glass substrate, or a substrate of other suitable material including but not limited to polycarbonate, silicon, or silica. The v-grooves 735 may be formed by any suitable process known in the art, e.g. by precision cutting or etching. An array of optical fibers 152 may be then placed in the v-grooves 735, as illustrated in FIG. 7B. The v-grooves 735 are dimensioned so that top portions of the optical fibers 152 project above the top surface 733 of the substrate 710. E.g., the portions of the optical fibers 152 above the surface 733 may be about 10% to 30% of the fiber diameter in height, e.g. about 10 to 40 μm.

Figure 7C:
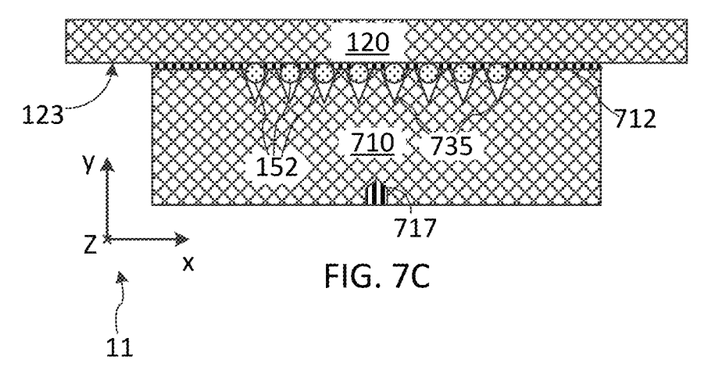

Referring to FIG. 7C, the process may further include placing the cap 120 over the substrate 710 on top of the optical fibers 152, such that the alignment surface 123 of the cap 120 is in direct contact with the top portions of the optical fibers 152 projecting from the surface 733. This step may include forcing some of the fibers 152 deeper into the corresponding v-grooves 735, so that the top portions of all of the fibers 152 are aligned along the alignment surface 123 of the cap 120. This also forces the optical cores of the fibers 152 to align, up to the fiber diameter and concentricity variation tolerances. The cap 120 may then be affixed, e.g. glued, to the substrate 710. E.g., the gap 712 between the cap 120 and the top surface 733 of the substrate 710 may be filled with suitable glue, which may then be cured as needed.

Figure 7D:
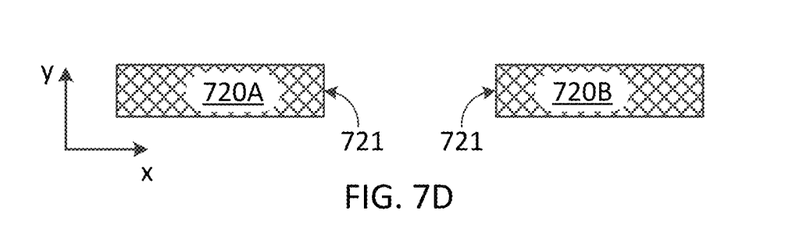
Figure 7E:
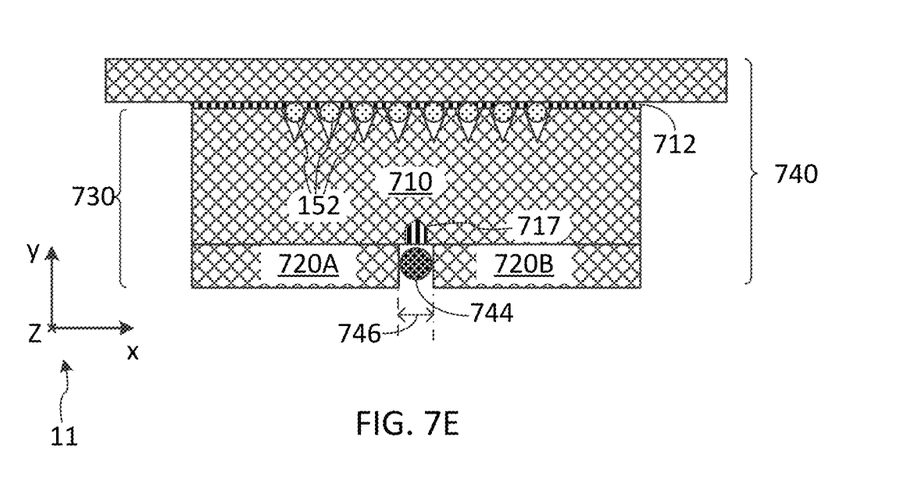
Figure 7F:
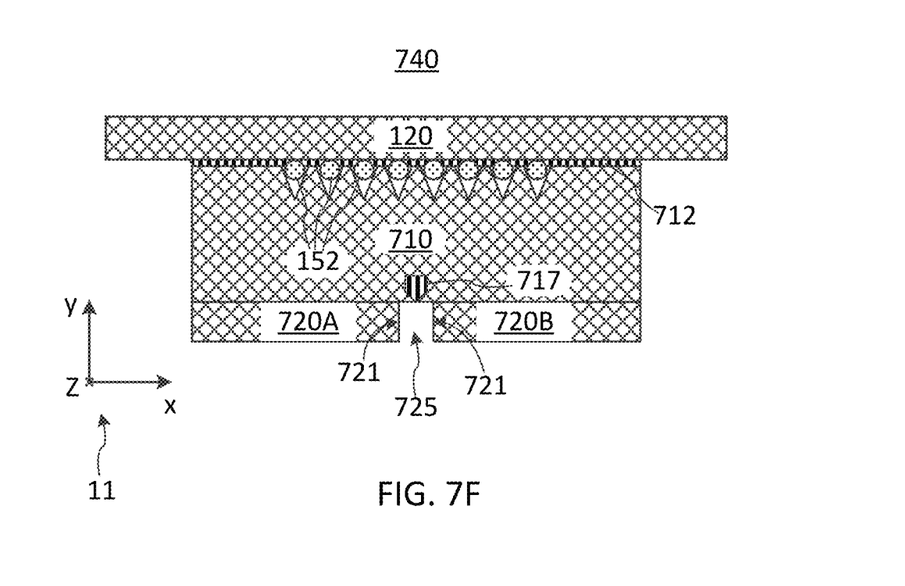

Referring to FIGS. 7D-7F, a notch at the bottom of a fiber positioning assembly, e.g. 740, may be formed by attaching two plates, 720A and 720B, to a bottom surface of the substrate 710 alongside but at some distance 746 from each other to form a fiber support member 730. The attaching may include gluing the plates 720A, 720B to the bottom surface of the substrate 710. Prior to the attaching, the side faces 721 of the plates 720A, 720B facing each other in the assembly 740 may be polished to the desired degree of flatness, e.g. to λ/2, λ/3, or λ/4 flatness as described above, or, e.g., to a flatness specification of 0.5 μm or better, or 0.2 μm or better. The fiber support member 730 is an example of the fiber support member 130. In a finished assembly, the thickness of a glue layer 712 between the bottom surface of the substrate 710 and the plates 720A, 720B may be controlled, e.g., to a +\−2 μm accuracy. The oversized rail 740 is a removable tool that allows the notch 725 to be formed when the side plates 720A, 720B press against removable rail 740. The notch later accommodates the alignment rail 160.

In one embodiment, an oversized rail member 744 may be used at the assembly stage to precisely position the plates 720A, 720B to a fiducial marker 717 at the bottom of the substrate 710. The oversized rail member 744 may have the width equal to a target spacing 746 between the plates 720A, 720B. The process may include providing the fiducial marker 717 at the bottom of the substrate 710 in a predetermined position relative to the v-grooves 733, e.g. laterally aligned to a center axis of the array of the v-grooves. The fiducial marker 717 indicates where a notch 725 (FIG. 7F) is to be formed. The process may include temporally placing the oversized rail member 744 longitudinally next to the bottom surface of the substrate 710 precisely aligned to the fiducial marker 717, and forcing the plates 720A, 720B tightly against the oversized rail member 744 at opposite sides thereof, with the polished side faces 721 of the plates 720A and 720B facing each other and forming internal side walls of the notch 725 (FIG. 7F). The notch 725 is an example of the notch 138. The width of the oversized rail member 744, and hence the spacing 746 between the plates 720A and 720B in the assembly 740, somewhat exceeds, e.g. by 0.5 μm to 5 μm, the width of the alignment rail, e.g. 160, that is attached to the bottom shelf of the connector frame.

Figure 8A:
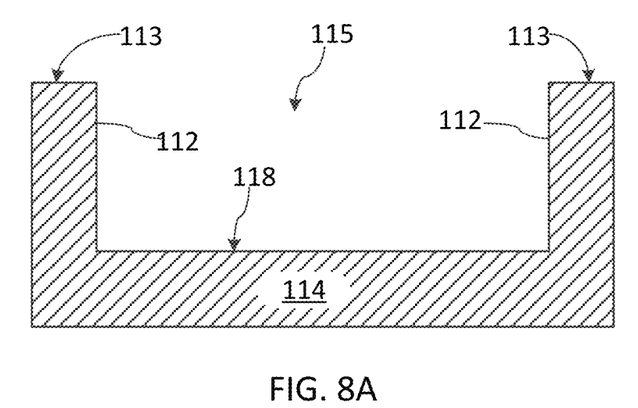
FIG. 8A is a schematic cross-sectional views of a frame of the optical connector prior to attaching a longitudinally extending rail thereto to facilitate lateral alignment.
Figure 8B:
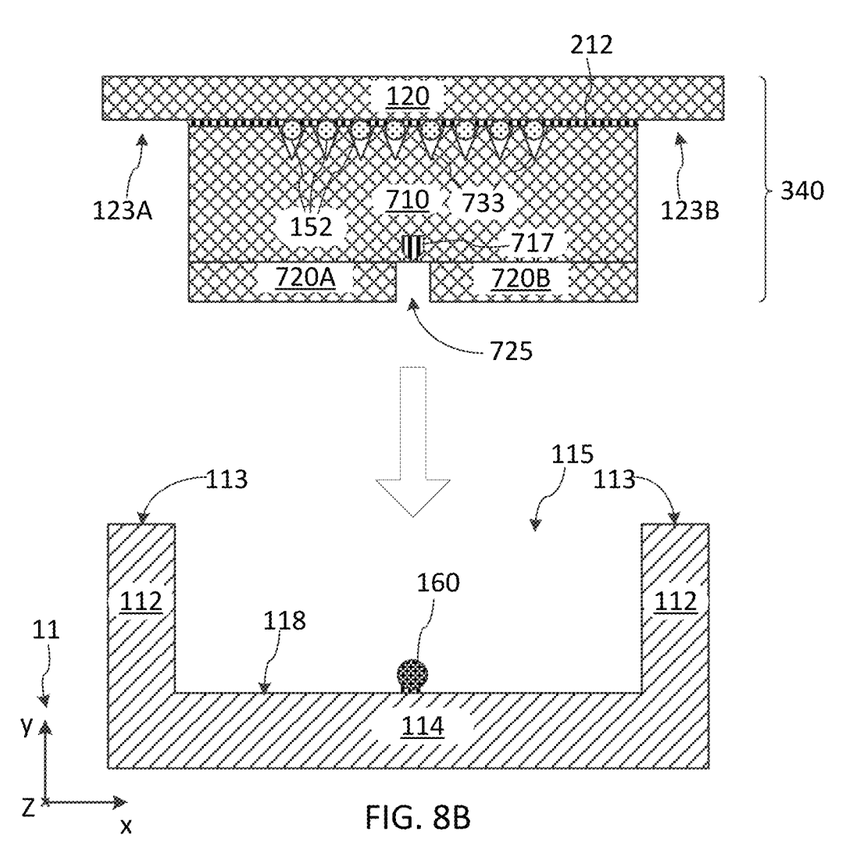
FIG. 8B is a schematic cross-sectional view of an optical connector frame dimensioned for accepting the fiber positioning assembly of FIG. 7F in a vertically- and laterally-controlled position.

Referring to FIGS. 8A and 8B, the connector fabrication process may further include fabricating the frame 110 with the support walls 112 projecting from the shelf 114, and gluing or soldering the alignment rail 160 at a target location at the bottom surface 118 of the shelf 114. In an example embodiment, the alignment rail 160 may be positioned in a middle portion of the width of the trench 115, at least one quarter, or one third, of the trench width from a nearest one of the walls 112, e.g. approximately equidistantly from the two walls 112. The process may include polishing the top surfaces 113 of the walls 112 to the desired flatness, e.g. λ/2, λ/3, or λ/4 if the operating wavelength λ is specified, or e.g. to a flatness of 0.5 μm or 0.2 μm in some example embodiments, as described above. FIG. 3 illustrates a perspective view of the frame 110 with the rail 160 attached. The assembly 740 may then be positioned within the trench 115 between the walls 112, so that the free portions 123A, 123B of the alignment surface 123 of the cap 120 rest upon the top surfaces 113 of the support walls 112, preferably in direct contact therewith along the whole length of the cap 120 and/or the assembly 740. The length 311 of the walls 112 (FIG. 3), which is also the length of the trench 115 therebetween, may exceed the length of the fiber positioning assembly 140 or 740, e.g. by a factor of 2 or more in some typical examples. The length 311 of the trench may be sufficient to accept the fiber positioning assembly 740 and another optical device, e.g. 410 (FIG. 4), to be positioned length-wise therein one after the other, in a precise mutual optical alignment due to the common alignment features 113 and 160.

Figure 9:
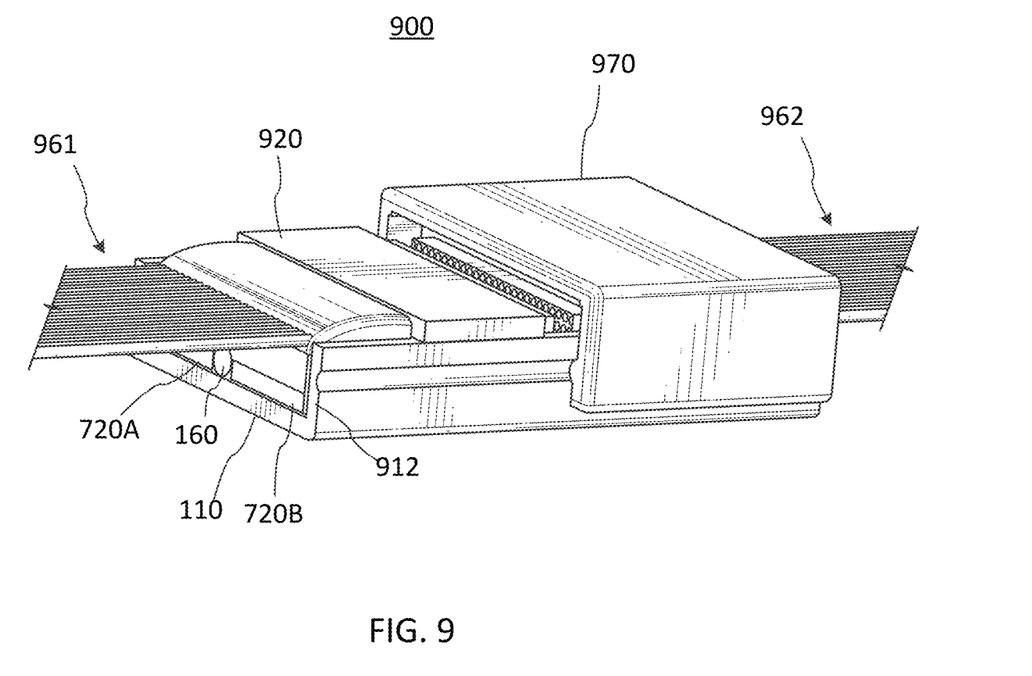
FIG. 9 is a schematic perspective view of an assembled optical connector device according to an example embodiment.

FIG. 9 illustrates a perspective 3D view of an example implementation 900 of the optical connector assembly according to the present disclosure. In this example, the optical connector assembly 900 connects two optical fiber arrays, an optical fiber array 961 and an optical fiber array 962, that are carried by respective fiber positioning assemblies sequentially located between support walls 912 of the connector frame, and having caps 920 resting upon the walls 912. A clamp shell 970 is shown to hold one of the fiber positioning assemblies in place between the support walls 912. The support walls 912, the caps 920, and the clamp shell 970 are examples of the support walls 112, the cap 120, and the clamp shell 170 described above.

The optical connector, examples of which are described above, may have significant advantages in alignment precision and/or ease of manufacturing compared to optical fiber connectors typically used in the art. One of the advantages relates to having the optical fibers, or planar optical waveguides in some embodiments, that are carried by two positioning assemblies inherently aligned to a common support surface of the frame, thereby inherently facilitating their mutual alignment in a vertical direction, i.e. normal to the plane of the fiber or waveguide arrays. This arrangement advantageously compares to a more conventional connector design wherein two fiber positioning blocks are aligned at their top or bottom surfaces that are distal to the fiber support surfaces thereof, necessitating the fiber positioning blocks being exact copies of each other. Furthermore, some connectors used in the art include two or more pins and correspondingly dimensioned two or more v-grooves for the lateral alignment of two fiber positioning blocks within a frame. However, this imposes an unnecessary constraint on the accuracy of groove-to-groove and pin-to-pin spacings, which may be detrimental to the yield of working connector assemblies. The use of a single alignment rail for the lateral alignment, as described above, instead of two or more pins, removes this over-constraint issue, as it eliminates the requirements on the pin-to-pin spacing precision, thereby simplifying the fabrication and potentially improving yield. Furthermore, it is typically easier to polish side faces of two glass plate to a desired flatness precision than to polish the internal walls of a v-groove. Thus, examples described above provide a passive optical connector that has a small footprint, may be easier to manufacture, and/or has an improved optical alignment accuracy, and thus a lower optical insertion loss, than some typical optical connectors used in the art.

The examples of optical connectors described above are not intended to be limiting, and many variations will become apparent to a skilled reader having the benefit of the present disclosure. For example, the fiber support member, such as e.g. 130, may be configured to support more than one optical fiber array, e.g. disposed side-by-side and/or one over the other.

One or more examples described above, e.g. in the summary section and with reference to any one or more of the FIGS. 1-9, provide an optical connector, comprising: a frame (e.g. 110, FIGS. 1-3, 8A-9) and a positioning assembly (e.g. 140, 740). The frame comprises a shelf (e.g. 114, FIGS. 1, 3, 8A-9) and two walls (e.g. 112, FIGS. 1-4, 8A-9) projecting therefrom, the walls being spaced apart to define a longitudinally extending trench (e.g. 115) therebetween. The positioning assembly is for positioning an array (e.g. 150, 961, 962) of optical fibers (e.g. 152) within the trench to optically couple with an optical device (e.g. 410, FIG. 4; 920, FIG. 9) disposed in the trench, and comprises: a fiber support member (e.g. 130, 730) comprising a planar top surface (e.g. 133, 733) having a plurality of longitudinal grooves (e.g. 135, 735) formed therein; the array of optical fibers being disposed in the grooves (e.g. 135 735), top portions of the optical fibers of the array projecting above the top surface (e.g. 133, 733) of the fiber support member; and a cap (e.g. 120) fixedly disposed over the fiber support member, the cap having an alignment surface (e.g. 123) resting upon the top portions of the optical fibers of the array. The cap is wider than the fiber support member, such that, when the positioning assembly is disposed within the trench in an operating position, free portions (e.g. 123A, 123B, FIG. 8B) of the alignment surface of the cap rest upon the walls to control a vertical alignment of the fiber support member within the trench. In operation, the positioning assembly may be disposed within the trench, with the alignment surface of the cap resting upon the walls.

In some implementations, the walls of the frame may have flat top surfaces, wherein the free portions of the alignment surface of the cap are in direct contact with the top surfaces of the walls when the fiber support member is in the operating position within the trench. In some implementations, the top surfaces of the walls and the alignment surface of the cap may be flat surfaces each having sub-micron flatness.

In any of the above implementations, the optical connector may further comprise a clamp shell (e.g. 170, FIG. 2, 970, FIG. 9) for holding the positioning assembly within the trench.

In any of the above implementations, the optical connector may have a gap between the alignment surface of the cap and the top surface of the fiber support member.

In any of the above implementations, the top surfaces of the walls and the alignment surface of the cap may each have a flatness of 0.5 microns or better.

In any of the above implementations, the cap may be glued to the top surface of the fiber support member.

In any of the above implementations, the positioning assembly may comprise a lateral alignment feature for controlling lateral positioning of the fiber support member between the walls. In some of such implementations, the lateral alignment feature may comprise a longitudinally extending notch (e.g. 138, FIG. 1; 725, FIG. 7F) in a bottom surface of the fiber support member, further comprising a rail (e.g. 160, FIGS. 1-4, 8B, 9) longitudinally fixed to a surface of the shelf between the walls, the rail being dimensioned to fit within the notch to control the lateral positioning of the fiber support member. In some of such implementations, the rail may have an approximately circular cross-section. The notch may be, e.g., about 0.5 microns to 5 microns wider than the rail.

In any of the above implementations, the notch may have two flat opposing internal surfaces having sub-micron flatness. In some of such implementations, the two opposing internal surfaces of the notch may be flat side faces (e.g. 721) of a pair of plates (e.g. 720A, 720B).

In any of the above implementations, the fiber support member may comprise: a fiber support substrate (e.g. 730, FIGS. 7A-8B) comprising the planar top surface with the v-grooves therein, and a pair of plates (e.g. 720A, 720B) affixed alongside each other at a bottom surface of the support substrate to form a notch therebetween (e.g. 138, 725) to accept a rail (e.g. 160) attached to the shelf between the walls.

In any of the above implementations, the optical connector may further comprise the optical device disposed between the walls, the optical device comprising one of: another fiber positioning assembly comprising another optical fiber array, and a photonic chip.

One or more examples described above, e.g. in the summary section and with reference to any one or more of the FIGS. 1-9, provide a method for fabricating the optical connector according to any one of the implementations described above. The method may comprise: polishing the alignment surface of the cap and top surfaces of the walls of the frame to sub-micron flatness; and attaching the cap to the fiber support member such that the alignment surface rests upon the top portions of the optical fibers of the array, and such that the alignment surface has free portions extending laterally beyond the fiber support member at both sides thereof. Some implementations of the method may comprise performing the polishing to a flatness of 0.5 μm or better.

Any of the above implementations may comprise attaching a longitudinally-aligned rail to a surface of the shelf between the walls, and forming a longitudinally extending notch at a bottom surface of the fiber support member in a pre-defined position relative to the optical fibers of the array, the notch dimensioned to accept the rail when the fiber support member is placed into the trench between the walls. Some of such implementations may comprise attaching a pair of alignment plates alongside each other to a bottom surface of a fiber support substrate to form the fiber support member, a space between proximate sides of the alignment plates defining the notch. Some of such implementations may further comprise polishing, prior to the attaching, the proximate side faces of the plates of the pair to a sub-micron flatness.

Unless explicitly stated otherwise, each numerical value and range should be interpreted as being approximate as if the word "about" or "approximately" preceded the value or range.

It will be further understood that various changes in the details, materials, and arrangements of the portions which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Furthermore in the description above, for purposes of explanation and not limitation, specific details are set forth such as particular architectures, interfaces, techniques, etc. in order to provide a thorough understanding of the present disclosure. In some instances, detailed descriptions of well-known devices, circuits, and methods are omitted so as not to obscure the description of the present disclosure with unnecessary detail. Thus, for example, it will be appreciated by those skilled in the art that block diagrams herein can represent conceptual views of illustrative circuitry embodying the principles of the technology. All statements herein reciting principles, aspects, and embodiments of the disclosure, as well as specific examples thereof, are intended to encompass both structural and functional equivalents thereof.

Thus, while the present disclosure has been particularly shown and described with reference to example embodiments as illustrated in the drawing, it will be understood by one skilled in the art that various changes in detail may be affected therein without departing from the spirit and scope of the disclosure as defined by the claims.

We claim:
1. An optical connector, comprising:
   a frame comprising a shelf and two walls projecting therefrom, the walls being spaced apart to define a longitudinally extending trench therebetween;
   a positioning assembly for positioning an array of optical fibers within the trench to optically couple with an optical device disposed in the trench, comprising:
      a fiber support member comprising a planar top surface having a plurality of longitudinal grooves formed therein;

the array of optical fibers disposed in the grooves, top portions of the optical fibers of the array projecting above the top surface of the fiber support member; and a cap fixedly disposed over the fiber support member, the cap having an alignment surface resting upon the top portions of the optical fibers of the array;

wherein the cap is wider than the fiber support member, such that, when the fiber support member is disposed within the trench in an operating position, free portions of the alignment surface of the cap rest upon the walls to control a vertical alignment of the fiber support member within the trench.

2. The optical connector of claim 1, wherein the positioning assembly is disposed within the trench, the alignment surface of the cap resting upon the walls.

3. The optical connector of claim 1, wherein the walls of the frame have flat top surfaces, and wherein the free portions of the alignment surface of the cap are in direct contact with the top surfaces of the walls when the fiber support member is in the operating position within the trench.

4. The optical connector of claim 3, wherein the top surfaces of the walls and the alignment surface of the cap are flat surfaces each having sub-micron flatness.

5. The optical connector of claim 3 further comprising a clamp shell for holding the positioning assembly within the trench.

6. The optical connector of claim 4 wherein the top surfaces of the walls and the alignment surface of the cap each have a flatness of 0.5 microns or better.

7. The optical connector of claim 3 wherein the cap is glued to the top surface of the fiber support member.

8. The optical connector of claim 3, wherein the positioning assembly comprises a lateral alignment feature for controlling lateral positioning of the fiber support member between the walls.

9. The optical connector of claim 8, wherein the lateral alignment feature comprises a longitudinally extending notch in a bottom surface of the fiber support member, further comprising a rail longitudinally fixed to a surface of the shelf between the walls, the rail being dimensioned to fit within the notch to control the lateral positioning of the fiber support member.

10. The optical connector of claim 9, wherein the rail has an approximately circular cross-section.

11. The optical connector of claim 10, wherein the notch is about 0.5 microns to 5 microns wider than the rail.

12. The optical connector of claim 10, wherein the notch has two flat opposing internal surfaces having sub-micron flatness.

13. The optical connector of claim 12, wherein the two opposing internal surfaces of the notch are flat side faces of a pair of plates.

14. The optical connector of claim 13, wherein the fiber support member comprises:

a fiber support substrate comprising the planar top surface with the v-grooves therein, and the pair of plates affixed alongside each other at a bottom surface of the support substrate to form the notch therebetween.

15. The optical connector of claim 1, further comprising the optical device disposed between the walls, the optical device comprising one of: another fiber positioning assembly comprising another optical fiber array, and a photonic chip.

16. A method for fabricating the optical connector of claim 1, comprising:

polishing the alignment surface of the cap and top surfaces of the walls of the frame to sub-micron flatness; and attaching the cap to the fiber support member such that the alignment surface rests upon the top portions of the optical fibers of the array, and such that the alignment surface has free portions extending laterally beyond the fiber support member at both sides thereof.

17. The method of claim 16, comprising performing the polishing to a flatness of 0.5 μm or better.

18. The method of claim 16, further comprising:

attaching a longitudinally-aligned rail to a surface of the shelf between the walls; and forming a longitudinally extending notch at a bottom surface of the fiber support member in a pre-defined position relative to the optical fibers of the array, the notch dimensioned to accept the rail when the fiber support member is placed into the trench between the walls.

19. The method of claim 18, wherein the forming a longitudinally extending notch comprises:

attaching a pair of alignment plates alongside each other to a bottom surface of a fiber support substrate, a space between proximate side faces of the alignment plates defining the notch.

20. The method of claim 19, comprising polishing, prior to the attaching, the proximate side faces of the plates of the pair to a sub-micron flatness.

* * * * *